3,029,002
METERING DISPENSER
Resta S. Gregoire, 117 S. Main St., Philippi, W. Va.
Filed June 2, 1958, Ser. No. 739,299
3 Claims. (Cl. 222—307)

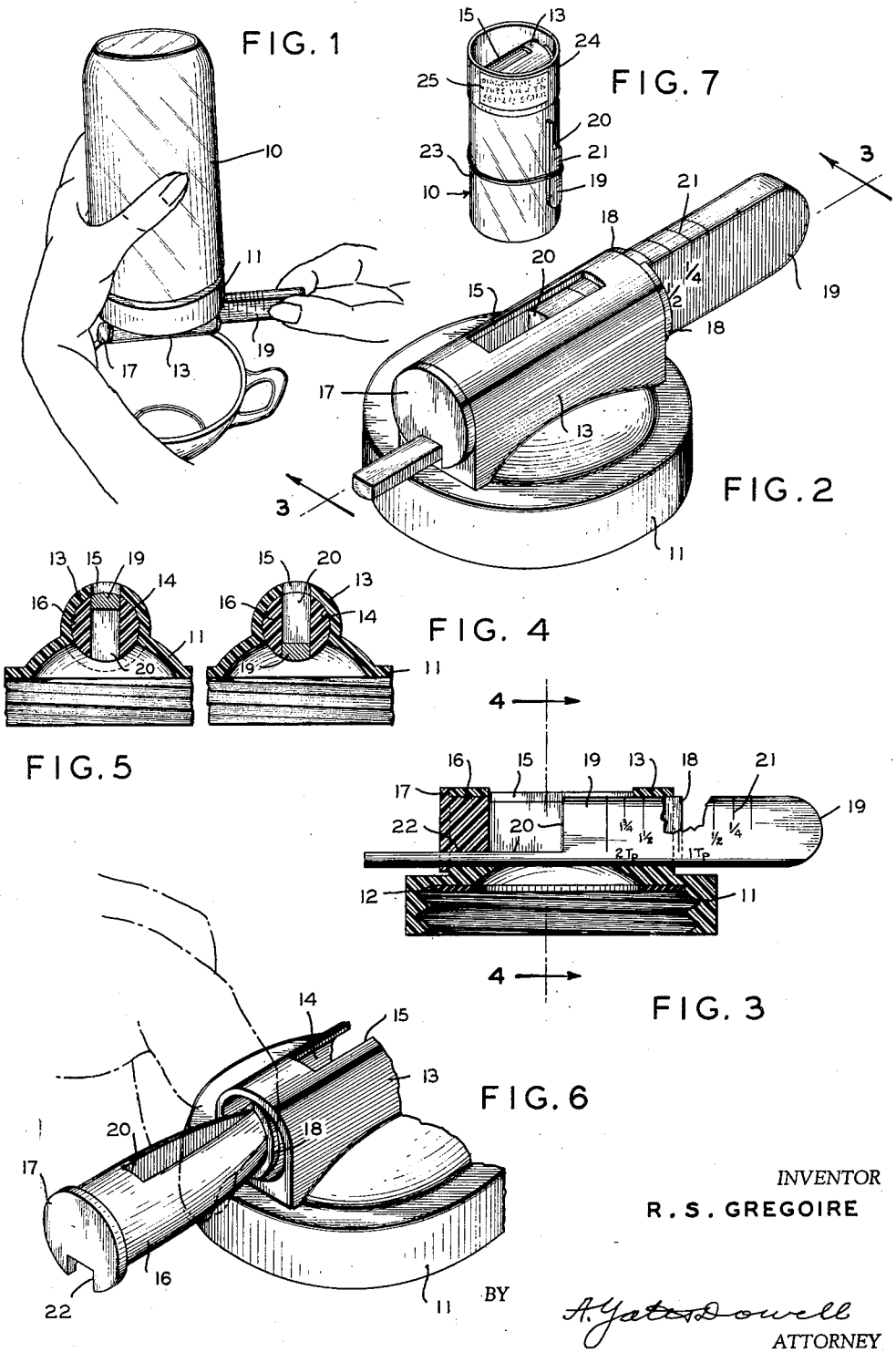

This invention relates to the packaging and handling of foods and other substances and particularly those in relatively fine powdered or granulated condition, kept in closed jars or other containers, and in which ordinarily a spoon or other measuring device is employed in the dispensing of the same.

The invention relates not only to the accurate dispensing of a variable measured amount of a product but also to the structure or mechanism by which such variable measured amount may be dispensed.

Commodities of various kinds have been contained in packages of all sorts and in the dispensing and use of the contained commodities there has been considerable waste. Also where the dispensed product has been one to be combined with other substances the proportions have not been uniform and has resulted in disappointing or unsatisfactory results.

It is an object of the invention to provide a variable metering dispenser by which the amount of a commodity dispensed may be easily determined and maintained uniform thereby conserving the dispensed material, and making it possible to insure uniform combining of selected ingredients.

Another object of the invention is to provide a variable metering dispenser in a cover or closure for a receptacle or container and by which the contents of such receptacle or container may be dispensed in the amount desired and in which the container is maintained sealed at all times.

A further object of the invention is to provide a metering and dispenser cover for a jar, can or other container or receptacle intended to hold sugar, coffee or other substance which may be measured and dispensed with ease and accuracy, in a minimum of time, and with maximum convenience.

Another object of the invention is to provide a relatively simple and inexpensive metering and dispensing attachment which can be used as a closure for a container and by which desired and varied amounts can be dispensed without the necessity of removing and replacing such closure.

Other objects and advantages of the invention will become apparent from the following description taken in conjunction with the accompanying drawing wherein:

FIG. 1 is a perspective illustrating one application of the invention;

FIG. 2, a perspective of the metering dispenser itself;

FIG. 3, a section on the line 3—3 of FIG. 2;

FIG. 4, a section on the line 4—4 of FIG. 3;

FIG. 5, a similar section with a rotary member rotated 180°;

FIG. 6, a fragmentary perspective illustrating the manner in which the rotary member is inserted in the cap; and FIG. 7, a perspective of a package with the cover of the present invention therein and the metering stick attached to the side.

Briefly stated, the invention is a device for dispensing a variable, measured amount, of relatively fine material in powdered or granulated condition from a jar or container in which the material is kept sealed at all times. A cover or cap for a jar or container is provided which cover or cap may be of the screw type with a sealing gasket and it may be applied to a jar or container holding for example instant coffee or other substance. Across the cover or cap is located a transversely disposed cylindrical valve chamber having openings with oppoiste sides of the cap for the discharge of a measured amount of the contents of the jar or container to which the cap is applied. A cylindrical valve body is located in the valve chamber, such valve body having a compartment to receive material from the jar. This compartment is made variable in size by the use of an adjustable metering device which when in adjusted position the chamber or compartment of the valve may be filled with material to be dispensed and the valve rotated to move the filled chamber or compartment from a position where it is in communication with the interior of the container to a position where it is in communication with the discharge or exterior of the container in order to dispense material from the container.

With continued reference to the drawing, a container 10 in the form of a jar or other type of receptacle may be provided with an internally threaded cap or cover 11 and a gasket 12 may be utilized for providing a tight seal between the cover or cap and the container. This type of container is employed for holding commodities of various kinds including coffee or other beverages to which hot water is added to render the same instantly or immediately usable, it being desirable to be able to transfer a small amount of the product from the jar or container with a minimum of effort and in a minimum of time instead of by the usual method of unscrewing the cap.

The cover 10 is provided with an enlargement 13 having a transversely disposed cylindrical valve chamber 14 communicating at one side with the interior of the cap and at its opposite side with a discharge opening 15 through which the contents of the jar may be dispensed.

Within the valve chamber 14 is mounted a generally cylindrical bifurcated valve body 16 having a head flange 17 adapted to engage the end of the enlargement or valve casing 13 which forms the housing or casing for the valve body 16. The bifurcated end of the valve body is provided with outwardly disposed flanges 18 which extend outwardly beyond and engage the opposite end of the valve casing from the head flange 17.

The valve body is constructed to be assembled with the valve casing by constricting the bifurcated end portion of the valve body as disclosed in FIG. 6 and forcing it all the way through the valve casing so that the bifurcated ends spring apart and occupy the position disclosed in FIG. 2. When the valve body is in the valve casing with bifurcated end across the top of the cover there is a passage directly through the cover to the exterior, the size of which passage is dependent upon the size of the bifurcation.

In order to prevent unobstructed flow through the valve casing and valve body, a metering stick 19 is provided, such metering stick being of a thickness to fit snugly within the bifurcation of the valve body and having one continuous surface disposed across the interior of the jar to exclude the contents of the jar from the bifurcation in the valve body and having its opposite portion 20 cut away to provide a compartment within the bifurcation of the valve body for the accommodation of a portion of the contents of the jar to which the cover is attached. The metering stick 19 is provided with suitable indicia 21 to indicate the settings in which the indicated amounts can be dispensed.

In the use of the invention a cover or cap 11 is applied to a jar 10 with a continuous edge of the metering stick closing the opening into the valve chamber from the jar or container to which the cover or cap is applied, at which time the contents will be kept sealed within the container. When it is desired to dispense a portion of the contents of the container, the metering stick 19 is adjusted endwise to contain the amount desired to be dispensed and the stick is then rotated 180° from the position shown in FIGS. 3 and 4, to the position shown in FIG. 6 whereupon on being inverted the space or chamber in the bifurcation in the valve body will be filled from the contents of the jar and thereafter upon rotation of the valve body to bring the bifurcation in alignment with the discharge passage 15, the discharge of such contents may be effected.

In order to accommodate the measuring stick the head portion of the valve body is provided with a slot 22 of a size to snugly accommodate the narrow portion of the measuring stick formed by the cut out portion 20.

In the shipment of containers with the cover applied the measuring stick 19 preferably is secured to the side of the jar by retaining band 23 of elastic or other material and a protective sleeve or cylinder 24 is provided of a diameter substantially corresponding to the diameter of the cap or cover in order to house the same. Also instructions 25 are applied to such band.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A dispensing device for metering a selected quantity of a fluent material or to provide for continuous flow of such fluent material comprising a base having an enlargement thereon and having a cylindrical bore extending completely therethrough and having a transverse passage communicating therewith and open at its ends, a cylindrical member having a cutaway therethrough extending completely to one end providing a tine on each side of said cutaway with said cutaway being adapted to register with said transverse passage, a slot extending from said cutaway to the closed end of said cylindrical member and communicating with said cutaway, a metering stick of a width to snugly fit within said cutaway with the outer surface of said metering stick completing the cylindrical shape of said cylindrical member, said metering stick having an extension at one edge received in the slot between said cutaway and said closed end of said cylindrical member whereby the spacing between the adjacent end of the body portion of said metering stick and the closed end of the cutaway provides a fluent material receiving chamber of adjustable size whereby material can be poured into said chamber from one end of said transverse passage and upon rotation of said cylindrical member and said metering stick the fluent material in said chamber may be dispensed from the other end of said transverse passage, said metering stick having an extension projecting outwardly for controlling the position of the metering stick and thereby of the chamber.

2. A dispensing device for metering a selected quantity of fluent material or to provide for continuous flow of such material comprising a container cover, an enlargement on said cover having a cylindrical bore therethrough and a transverse passage communicating therewith, a bifurcated valve body rotatably mounted in the cylindrical bore of said enlargement with said bifurcation adapted to register with said transverse passage, a slot extending from said bifurcation to the closed end of said valve body, a metering stick having an outwardly extending projection slidably received within said bifurcation with the outer surface of said metering stick completing the cylindrical shape of said valve body, an extension on one end of said stick adapted to be received in said slot whereby the space defined by said stick and extension and the closed end and bifurcation of said valve body provides a receiving chamber of adjustable size so that material can be poured into said chamber from one end of said transverse passage and upon rotation of said valve body and said metering stick the material may be dispensed from the other end of said transverse passage.

3. The structure of claim 2 in which the outwardly extending projection of the metering stick has indicia for indicating the relative size of said chamber.

References Cited in the file of this patent

UNITED STATES PATENTS

| 2,373,124 | Frank | Apr. 10, 1945 |
| 2,687,237 | Stout | Aug. 24, 1954 |
| 2,779,512 | Steele et al. | Jan. 29, 1957 |

FOREIGN PATENTS

| 3,756 | Switzerland | Apr. 11, 1891 |